US012452628B2

(12) United States Patent
Kountouris et al.

(10) Patent No.: US 12,452,628 B2
(45) Date of Patent: Oct. 21, 2025

(54) METHOD AND TERMINAL FOR COMMUNICATING AN ESTIMATE OF THE LOCATION OF AT LEAST ONE RADIO ENDPOINT TO A CONNECTED OBJECT

(71) Applicant: Orange, Issy-les-Moulineaux (FR)

(72) Inventors: Apostolos Kountouris, Chatillon (FR); Philippe Surbayrole, Chatillon (FR)

(73) Assignee: Orange, Issy-les-Moulineaux (FR)

( * ) Notice: Subject to any disclaimer, the term of this patent is extended or adjusted under 35 U.S.C. 154(b) by 819 days.

(21) Appl. No.: 17/622,442

(22) PCT Filed: Jun. 18, 2020

(86) PCT No.: PCT/EP2020/066857
§ 371 (c)(1),
(2) Date: Dec. 23, 2021

(87) PCT Pub. No.: WO2020/260113
PCT Pub. Date: Dec. 30, 2020

(65) Prior Publication Data
US 2022/0264253 A1 Aug. 18, 2022

(30) Foreign Application Priority Data
Jun. 24, 2019 (FR) .................................. 1906777

(51) Int. Cl.
*H04W 4/029* (2018.01)
*H04W 4/80* (2018.01)
*H04W 64/00* (2009.01)

(52) U.S. Cl.
CPC ............. *H04W 4/029* (2018.02); *H04W 4/80* (2018.02); *H04W 64/003* (2013.01)

(58) Field of Classification Search
CPC ...... H04W 4/029; H04W 4/80; H04W 64/003
(Continued)

(56) References Cited

U.S. PATENT DOCUMENTS 9,182,231 B2 * 11/2015 Skaaksrud ......... G06Q 10/0835
10,462,609 B1 * 10/2019 Carroll .................. H04W 4/029
(Continued)

FOREIGN PATENT DOCUMENTS

| GB | 2539952 A | 1/2017 |
|---|---|---|
| WO | 2016091284 A1 | 6/2016 |

OTHER PUBLICATIONS

International Search Report dated Sep. 14, 2020 for corresponding International Application No. PCT/EP2020/066857, Jun. 18, 2020.
(Continued)

*Primary Examiner* — William Nealon
(74) *Attorney, Agent, or Firm* — David D. Brush; Westman, Champlin & Koehler, P.A.

(57) ABSTRACT

A method for communicating an estimate of the location of at least one radio terminal to a connected object. The method is implemented by a mobile terminal and includes: receiving, at a given time, via at least one received radio signal, at least one identifier of a radio terminal; obtaining at least one estimate of the location of an identified radio terminal; associating, with each identifier, the location of the corresponding radio terminal and the time of reception of the corresponding radio signal; and broadcasting the aforementioned association via at least one radio signal to at least one connected object.

11 Claims, 4 Drawing Sheets

(58) Field of Classification Search
USPC .................................................... 455/456.1
See application file for complete search history.

(56) References Cited

U.S. PATENT DOCUMENTS

| | | | | |
|---|---|---|---|---|
| 11,368,815 | B2* | 6/2022 | Klinkner | H04W 4/029 |
| 11,531,081 | B2* | 12/2022 | Wirola | H04W 4/33 |
| 2016/0295358 | A1* | 10/2016 | Cariss | H04W 4/02 |
| 2017/0347228 | A1* | 11/2017 | Kerai | H04W 4/80 |
| 2019/0122174 | A1* | 4/2019 | Gil | G06Q 10/0833 |
| 2020/0386848 | A1* | 12/2020 | Wirola | G01S 5/02523 |
| 2021/0120371 | A1* | 4/2021 | Klinkner | G08B 21/0277 |
| 2021/0385623 | A1* | 12/2021 | Wang | H04W 4/029 |

OTHER PUBLICATIONS

Written Opinion of the International Searching Authority dated Sep. 14, 2020 for corresponding International Application No. PCT/EP2020/066857, filed Jun. 18, 2020.

English translation of the Written Opinion of the International Searching Authority dated Sep. 23, 2020 for corresponding International Application No. PCT/EP2020/066857, filed Jun. 18, 2020.

"3rd Generation Partnership Project; Technical Specification Group Radio Access Network; Universal Terrestrial Radio Access (UTRA) and Evolved UTRA (E-UTRA); User Equipment (UE) performance requirements for RAT—Independent Positioning Enhancements (Release 15)", 3GPP Standard; Technical Specification; 3GPP TS 37.171, 3rd Generation Partnership Project (3GPP), Mobile Competence Centre ; 650, Route Des Lucioles ; F-06921 Sophia-Antipolis Cedex ; France, vol. RAN WG4, No. V15.2.0, Apr. 4, 2019, pp. 1-34, XP051723303.

"3rd Generation Partnership Project; Technical Specification Group Services and System Aspects; Release 14 Description; Summary of Rel-14 Work Items (Release 14)", Nov. 27, 2017 (Nov. 27, 2017), 3GPP Draft; S1-174007, 3rd Generation Partnership Project (3GPP), Mobile Competence Centre ; 650, Route Des Lucioles ; F-06921 Sophia-Antipolis Cedex ; France Retrieved from the Internet: URL:http://www.3gpp.org/ftp/tsg%5Fsa/WG1%5FServ/TSGS1%5F80%5FReno/docs/.

Rohde & Schwarz, "New BLE Reporting Test", vol. RAN WG5, No. Berlin, Germany; Aug. 21, 2017-Aug. 25, 2017, Sep. 10, 2017 (Sep. 10, 2017), 3GPP Draft; 37571-1_CR0213R1_(REL-14)_R5-175188, 3rd Generation Partnership Project (3GPP), Mobile Competence Centre ; 650, Route Des Lucioles ; F-06921 Sophia-Antipolis Cedex ; France Retrieved from the Internet: URL:http://www.3gpp.org/ftp/Meetings_3GPP_SYNC/RAN/Docs/, XP051324006.

CMCC et al., "Update to WLAN measurement collection in LTE Logged MDT", vol. RAN WG5, No. Reno, Nevada, United States; May 13, 2019-May 17, 2019, Jun. 2, 2019 (Jun. 2, 2019), 3GPP Draft; 36523-1_CR4818R1_(REL-16)_R5-194888 Update to WLAN Measurement Collection in LTE Logged MDT, 3rd Generation Partnership Project (3GPP), Mobile Competence Centre ; 650, Route Des Lucioles ; Retrieved from the Internet: http://www.3gpp.org/ftp/Meetings%5F3GPP%5FSYNC/RAN/Docs/RP%2D190880%2Ezip [retrieved on Jun. 2, 2019] XP051746868 the whole document.

* cited by examiner

METHOD AND TERMINAL FOR COMMUNICATING AN ESTIMATE OF THE LOCATION OF AT LEAST ONE RADIO ENDPOINT TO A CONNECTED OBJECT

CROSS-REFERENCE TO RELATED APPLICATIONS

This Application is a Section 371 National Stage Application of International Application No. PCT/EP2020/066857, filed Jun. 18, 2020, the content of which is incorporated herein by reference in its entirety, and published as WO 2020/260113 on Dec. 30, 2020, not in English.

TECHNICAL FIELD

The present invention relates generally to the field of connected objects and more particularly to methods and devices that are able to optimize their energy resources in order to locate themselves.

PRIOR ART

As part of future developments towards the Internet of Things (IoT), the number of connected objects deployed will increase considerably. A very large proportion of these objects will be devices that are very constrained, on the one hand in regard to hardware, with hardware that is simple and inexpensive to produce, and on the other hand in regard to energy consumption, so as not to have to charge them too regularly.

However, these objects will have to be connected to radio networks in order to be able to communicate information on their status, their measurements, their condition, etc. These objects may also need to know their position in order to inform a service or a third party thereof in real time or in non-real time. In such cases, it would therefore be useful if the object could estimate its location to within a degree of uncertainty.

In addition, on the one hand, access via Wi-Fi™ or mobile radio communication (EDGE, UMTS and LTE etc.) is not always available and, on the other hand, these networks were not designed in order to optimize the consumption of the terminals and their cost of manufacture. This therefore poses a problem for connected objects, which need to greatly reduce their consumption because they must remain autonomous for long periods of time. Geolocation solutions using a GPS (Global Positioning System) module or even triangulation solutions via mobile base stations are also not recommended in the aforementioned cases because they still consume too much energy and are still too expensive, since they require either a GPS module or a mobile radio communication module.

Solutions have been designed and implemented in order to overcome these problems, in particular solutions based on systems of WPS (Wi-Fi Positioning System™) type that allow positioning to be carried out without resorting to GPS-type systems. This requires an object to request remote services via a connection to the Internet in order to have access to the location of the radio endpoints detected locally. The location of the endpoints is then used by the remote service to calculate an estimate of the position of the object by using various methods such as the one known as multilateration. Subsequently, the position of the object is sent to the object by means of the Internet connection.

The aforementioned technique is widely used by a terminal of smartphone type, which can thus be located by virtue of a combination of techniques calling in particular for its GPS device assisted by the cellular network (A-GPS); in addition, a smartphone can increase the accuracy of its location by requesting, via Internet access, a WPS-type service provided by a service provider. Given that the resources available to a smartphone are far superior to those available to connected objects, which are produced at very low cost, deployed in large numbers and need to have very long energy autonomy, such solutions are not appropriate. The connected objects in question in the context of the present invention do not have a standard Internet connection, nor abundant memory and a processing unit having sufficient power.

DISCLOSURE OF THE INVENTION

The invention aims to improve the situation described above by proposing a method and a device for evaluating the location of at least one radio endpoint by means of a radio terminal. This method does not have the drawbacks mentioned above, in particular because, with regard to an object wishing to connect, the method does not require the implementation of any energy-consuming cellular connection module, such as a mobile radio communication module, or any location module such as a GPS module or any other computation or memory module necessary for the implementation of the solutions known from the prior art. Indeed, these modules are known to consume hardware resources or to be costly with regard to the intended use.

The method according to the invention thus makes it possible to take advantage of resources associated with the terminals located in the immediate environment of the object in question, in particular mobile terminals of smartphone type, in order to recover useful data so that the object can calculate its position itself and communicate with a mobile terminal using an energy-saving communication protocol. According to the method according to the invention, a mobile terminal can constitute a database comprising location data for radio endpoints located in its vicinity, and can broadcast said location data by short waves, in this same vicinity, to any connected object wishing to locate itself.

To this end, an object of the present invention relates to a method for communicating an estimate of the location of at least one radio endpoint to a connected object, this method being implemented by a mobile terminal and comprising:

receiving, at a given time, by means of at least one received radio signal, at least one identifier of the (at least one) radio endpoint;

obtaining at least an estimate of the location of the (at least one) radio endpoint;

associating the estimated location of the (at least one) radio endpoint and the aforementioned given time with said at least one identifier;

broadcasting the resulting association to at least one connected object by means of at least one radio signal.

The method described above makes it possible for a mobile radio terminal to broadcast location information for radio endpoint(s) to its surroundings. This information will be received and used by objects located in these surroundings to locate themselves. The mobile radio terminal implementing the method receives, at a given time, at least one radio signal coming from at least one radio endpoint in its surroundings. By analyzing this (at least one) radio signal, the mobile terminal extracts therefrom information relating to the radio endpoint(s), such as identifier information or, where appropriate, one or more estimates of the location of the radio endpoint. If the radio endpoint in question is not able to provide such a location estimate, then the mobile radio terminal can engage other mechanisms in order to evaluate the location of the radio endpoint.

The mobile radio terminal therefore associates at least one location estimate and the time of reception of the corresponding radio signal coming from the radio endpoint in question with this (or these) identifier(s). This association of data is then broadcast by the mobile radio terminal to the objects that are in its vicinity in order to help them locate themselves. This association of information can then be saved in the mobile terminal in the form of an entry in a database and can constitute a map of radio endpoints.

The solution defined according to the method of the invention represents a simple and economical solution in order to broadcast and relay location information for radio endpoints in a geographical area to connected objects that are located close to these radio endpoints and that have rigid constraints in terms of energy consumption. Indeed, since these objects cannot estimate their own location by using services offered by location service providers, the method proposed here allows them to access useful information, despite their low hardware and energy resources. A main advantage of the method described lies in the fact that the obtaining, by an object in question, of location data for radio endpoints does not require the object to access a remote data network, such as an Internet network, for example, but consists only in the reception of data broadcast on a radio channel by means of a mobile terminal that is within radio range of the object in question. This facilitated access to location data for radio endpoints therefore consumes few computing resources and consequently little energy for this or these objects.

According to a particular embodiment of the method described above, said estimate of the location of at least one radio endpoint is provided by the mobile terminal or by a third-party terminal or service, and is communicated to the mobile terminal.

This embodiment thus makes it possible to have the estimate of the location of a radio endpoint provided by the mobile terminal itself or by a third-party terminal or service, and this estimate is then communicated to the mobile terminal. The estimate of the location is provided either by a location computation module of the mobile terminal (for example a GPS-type module) or by any other third-party module, and is then transmitted to the mobile terminal via a communication network. This particular feature of the method allows, in the event of at least one radio endpoint being unable to communicate its location to the mobile terminal, the location of this at least one endpoint to be obtained by using various methods, be they specific to the mobile radio terminal or provided by a third party. If the location of this at least one endpoint is provided by the mobile radio terminal, the latter can decide to assign its own location to the radio endpoints from which it recently received the radio signal and that still need to be located. If the location is provided by a third party, the terminal can request a remote service having servers accessible via the Internet so that this service can provide it with the data for estimating the location of the radio endpoints identified previously. The radio terminal can also request other mobile terminals or other radio endpoints, directly or by means of communication networks, in order to have access to information for estimating the location of radio endpoints not yet located.

According to a particular embodiment of the method described above, said estimate of the location of at least one radio endpoint is updated following the acquisition, at a later time, of at least one new piece of location information for at least one radio endpoint.

This embodiment thus makes it possible to update the estimate of the location of at least one radio endpoint following the acquisition, at a later time, of at least one new piece of location information for at least one radio endpoint. This particular feature of the invention allows the accuracy of the location of a radio endpoint to be improved by adding information deriving from third-party terminals or from the mobile terminal. Indeed, this addition of location information allows the mobile radio terminal to calculate a new position for the radio endpoint in question by using techniques known from the prior art, such as techniques known as multilateration, triangulation, barycenter, etc. The database comprising the identification information for the radio endpoints and their location at a given time is therefore made more reliable by the addition of the aforementioned information coming from third-party terminals.

According to a particular embodiment of the method described above, at least one broadcast radio signal is a short-range radio signal.

This embodiment thus makes it possible for the broadcast radio signal to be a short-range radio signal, as is the case with a Bluetooth® signal. This particular feature of the method allows a short-range signal (for example of Bluetooth® type) to be broadcast to the objects that seek to locate themselves. This type of signal and in particular signals of Bluetooth® Low Energy type define mobile communication protocols that allow optimization of the energy of the terminals wishing to communicate with one another.

According to a particular embodiment of the method described above, at least one received radio signal is a signal deriving from a local access point.

This embodiment thus makes it possible for the received radio signal to be a signal deriving from a local access point, such as a Wi-Fi or Bluetooth® signal, for example. This particular feature of the method allows reception of signals deriving from terminals that have the function of being local access points and are able to transmit using Wi-Fi® or using Bluetooth®, for example, because these are the protocols most used by fixed radio endpoints, such as Wi-Fi hotspots installed in public spaces or in commercial areas. The advantage of these Wi-Fi or Bluetooth hotspots is that they are numerous and constantly broadcast their identity. Restricting the reception of the signals received to signals deriving from local access points, such as Wi-Fi or Bluetooth signals, also allows a reduction in the probability of identifying, and therefore of locating, mobile terminals, since the method according to the invention aims to create a database of fixed terminals in order to help connected objects to locate themselves. The other advantage of receiving Wi-Fi or Bluetooth radio signals lies in their ease of use and their low consumption, in particular as far as Bluetooth Low Energy® radio signals are concerned.

According to a particular embodiment of the method described above, the estimate of the location comprises margin-of-error information for this estimate.

This embodiment makes it possible to transmit additional information to the objects seeking to locate themselves. This additional information is broadcast to the connected objects and therefore allows these objects to make their location more reliable by virtue of this location estimate margin-of-error information. This margin of error can be provided by a third-party service following a location request made by the mobile radio terminal. It can also be calculated by the mobile radio terminal itself, for example by means of a GPS location module or else by crossing location data obtained from third parties (for example from other mobile radio terminals or services accessible on the Internet) with data calculated by the mobile radio terminal. Crossing these data thus allows the mobile radio terminal to recalculate, in addition to a new location of the radio endpoints, a new margin of error and therefore to obtain a more reliable estimate of the location. The calculation of this margin of error can depend on various characteristics of the signal received, and transmitted by the radio endpoints, such as, for example, its type, its power and its frequency.

According to a particular embodiment of the method described above, the association that is broadcast is the one that comprises at least one identifier associated with at least one radio endpoint located within a given radius around the mobile terminal.

This embodiment thus makes it possible to filter the location information for radio endpoint(s) to be broadcast, so as to keep only the information concerning the radio endpoints of interest to the connected objects seeking to locate themselves. This particular feature of the method according to the invention therefore allows a significant reduction in the information broadcast by the mobile terminal, by sending only location data or margin-of-error data that are linked to the radio endpoints that are located within a given radius around the mobile radio terminal. The reduction in the information that is broadcast therefore allows a reduction in the data processing calculations by the connected objects that seek to locate themselves.

According to a particular embodiment of the method described above, the association that is broadcast is the one that comprises the most recent time of reception of a radio endpoint identifier.

This embodiment thus makes it possible to broadcast only a data file of a reasonable size to the connected objects, such a file containing only the most recent data concerning the location of the radio endpoints that is estimated by the mobile radio terminal. This feature also allows information concerning radio endpoints whose locations have been previously saved in the mobile radio terminal and that would be mobile endpoints or fixed radio endpoints that are no longer operational not to be kept. Indeed, the non-operational mobile or fixed radio endpoints may no longer be present in the vicinity of the mobile terminal. They are therefore not taken into account in the broadcast of the aforementioned association.

According to a particular embodiment of the method described above, the broadcast of the identifier-location association comprises location information for the mobile radio terminal.

This embodiment thus makes it possible to transmit information, such as the location of the mobile radio terminal and possibly a margin of error for the estimate of this location, to the at least one connected object. This information can be useful to this connected object to then estimate its own location.

The various aforementioned embodiments or implementation features may be added, independently or in combination with one another, to the communication method such as defined above.

The invention also relates to a mobile radio terminal implementing a method for communicating an estimate of the location of at least one radio endpoint to a connected object, comprising the following operations, implemented by a processor of the mobile terminal:

receiving, at a given time, by means of at least one received radio signal, at least one identifier of said at least one radio endpoint;

obtaining at least an estimate of the location of said at least one radio endpoint;

associating said location of said at least one radio endpoint and said given time with said at least one identifier;

broadcasting said association to at least one connected object by means of at least one radio signal.

Such a terminal is in particular capable of implementing the aforementioned method for communicating an estimate of the location of at least one radio endpoint to a connected object, according to any one of the aforementioned embodiments.

The invention also relates to a computer program comprising instructions for implementing the method for communicating an estimate of the location of at least one radio endpoint to a connected object, according to any one of the particular embodiments described above, when said program is executed by a processor.

Such instructions can be stored durably in a non-transient memory medium of the mobile radio terminal.

This program may use any programming language and be in the form of source code, object code or intermediate code between source code and object code, such as in a partially compiled form, or in any other desirable form.

The invention is also aimed at a computer-readable recording medium or information medium, comprising instructions of a computer program as mentioned above.

The recording medium may be any entity or device capable of storing the program. For example, the medium may comprise a storage means, such as a ROM, for example a CD-ROM or a microelectronic circuit ROM, or else a magnetic recording means, for example a USB key or a hard disk.

Moreover, the recording medium may be a transmissible medium such as an electrical or optical signal, which may be conveyed via an electrical or optical cable, by radio or by other means. The program according to the invention may in particular be downloaded from an Internet-type network.

As an alternative, the recording medium may be an integrated circuit in which the program is embedded, the circuit being designed to execute or to be used in the execution of the aforementioned communication method.

BRIEF DESCRIPTION OF THE DRAWINGS

Other features and advantages of the invention will become more clearly apparent upon reading the following description of particular embodiments, provided by way of simple illustrative and nonlimiting examples, and the appended drawings, in which.

DETAILED DESCRIPTION

General Principle of the Invention

A mobile radio terminal has computing capabilities and possibly integrated modules allowing it to estimate the location of radio endpoints around its position. Indeed, by virtue of its intrinsic capabilities, the mobile radio terminal is able either to request remote third-party services in order to obtain this location estimate, or to provide this estimate by its own means, such as using a GPS-type location module integrated in the terminal.

The mobile terminal having received the location data for the fixed radio endpoints around it can optionally store these data in memory in order to constitute a database of these locations of radio endpoints. Subsequently, the mobile radio terminal broadcasts some or all of the information of the location estimates for the radio endpoints and also their identifiers and the time of this estimate to any connected object seeking to locate itself. This information broadcast is provided by radio using protocols known to connected objects such as, for example, Wi-Fi® or Bluetooth® protocols. The method of the invention favors radio communication protocols suitable for optimizing the energy and the computing resources of a system, as is the case with the Bluetooth Low Energy® protocol, for example.

To reliably estimate its location, the connected object that receives the information broadcast by the mobile terminal needs estimates for fixed radio endpoints located in its surroundings. The estimate is even more reliable if the connected object receives information on the margin of error for the location estimates for the radio endpoints in its surroundings.

The method of the invention does not define a method for differentiating between the fixed endpoints and other equipments that would be mobile; however, a judicious choice of radio protocols received by the mobile terminal already allows a large proportion of the signals coming from these mobile equipments to be filtered and therefore not to be received because these protocols are mainly used by fixed radio endpoints. In addition, the principle of the invention is to capitalize on a large volume of mobile terminals having access to this radio endpoint location information in order to compare these data and to delete all data deriving from mobile equipments. Likewise, the connected object can also perform this comparison and this filtering because it may be able to receive a large quantity of location estimates for radio endpoints located in its vicinity, given the high density of mobile terminals, such as smartphones, or sophisticated connected objects such as GPS navigators or connected watches.

Specific Embodiments

There follows a description, with reference to FIGS. 1 to 7, of a method and associated devices for communicating an estimate of the location of at least one radio endpoint to a connected object.

Such a process takes place as follows.

Figure 1:
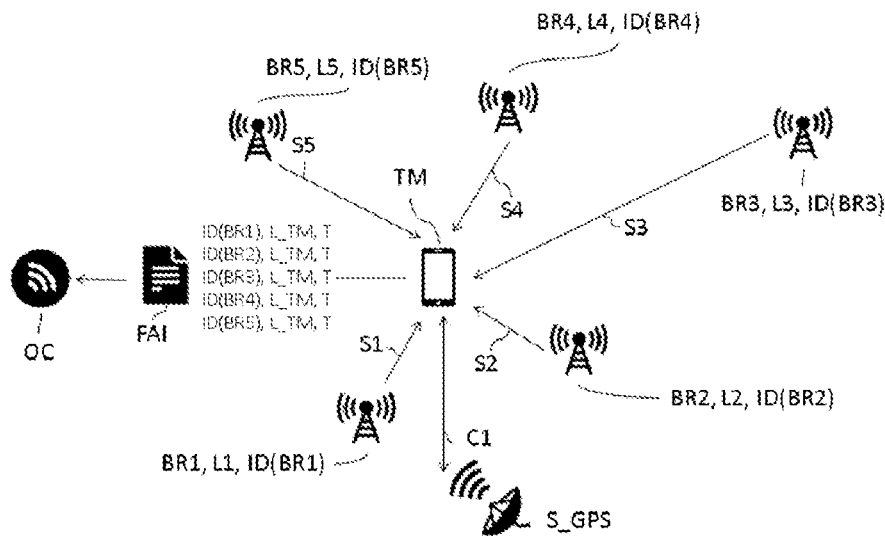
FIG. 1 shows an illustrative diagram of a communication environment in which a method according to the invention is implemented.

FIG. 1 illustrates a mobile radio terminal TM. This mobile radio terminal TM can be a smartphone or any mobile device having computing and processing capabilities of a computer. This terminal is able to receive different types of radio signals. In this example, the mobile radio terminal TM receives five different signals called S1 to S5, directly deriving from radio endpoints respectively called BR1 to BR5. In this exemplary implementation, the signals are of Wi-Fi® type. In the Wi-Fi protocol, there is provision for a transmitting terminal, a Wi-Fi radio hotspot in this example, to be able to constantly transmit a signal allowing this terminal to be identified. The identifier of a Wi-Fi network that is broadcast by the Wi-Fi radio hotspot attached to this network is called SSID (Service Set Identifier). In this exemplary implementation, the identifiers ID(BR1) to ID(BR5) of the respective Wi-Fi radio hotspots BR1 to BR5 are five different SSIDs. With the Bluetooth Low Energy protocol, there is also provision for each endpoint or equipment to have a unique identifier. The mobile radio terminal TM therefore extracts five different identifiers for the five Wi-Fi hotspots in its vicinity.

Subsequently, the mobile radio terminal TM requests a GPS-type service in order to estimate a location of the five radio endpoints by means of a communication C1 with a satellite S_GPS and the GPS module (not illustrated in FIG. 1) of the mobile radio terminal TM. This communication C1 allows it to obtain a location L_TM that corresponds to estimation information for the location of the mobile radio terminal TM. This estimation information can include coordinates in three-dimensional space but it can also comprise information to define a location area for the mobile radio terminal TM. In this exemplary implementation of the method, the same location estimate corresponding to the location estimate L_TM for the mobile radio terminal is assigned to the five Wi-Fi hotspots. In this case, the location estimates L1 to L5 are equal to the location estimate L_TM for the mobile radio terminal TM.

For each identifier sent by the five Wi-Fi radio hotspots, the terminal then associates this location L_TM and the time of reception T of each of these identifiers. This time corresponds to the time of last reception of the signals S1 to S5 from the five endpoints. The time of reception of the five signals cannot in fact be unique, since there is a tiny time difference between the reception of the different signals. However, according to the method, a single time T is considered that is on a time scale such that the reception of the signals is considered to be quasi-simultaneous. It is then this association of information, therefore, that is broadcast by the mobile radio terminal by radio to any connected object OC that wishes to locate itself. The connected object OC therefore receives at least one association of information ID(BR1), L_TM, T. In the example shown, the connected object OC receives five associations of information ID(BR1), L_TM, T to ID(BR5), L_TM, T. These different associations of information can take the form of an FAI computer file of flat file type or even a database. The FAI file must, however, be adapted for connected objects OC that have low computing resources. This FAI association of information file can also contain associations of information deriving from signals received at previous times in order to allow the connected object to estimate its location more reliably, by cross-checking these associations of information at different times.

Figure 2:
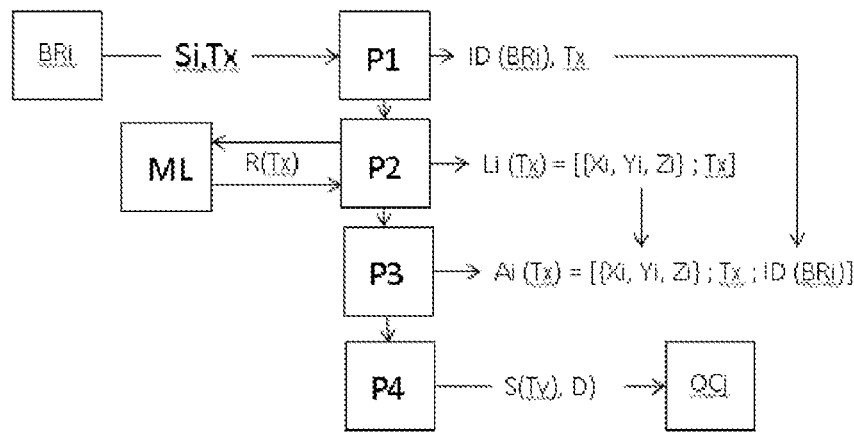
FIG. 2 shows an implementation example for the main steps of a method according to the invention in detail.

FIG. 2 illustrates an implementation example for the main steps of the method of the invention that are implemented by a mobile radio terminal. At P1, at least one radio signal Si deriving from at least one radio endpoint BRi located within radio range of the mobile terminal is received at the time Tx. The processing carried out by the mobile radio terminal at P1 allows at least one identifier ID(BRi) deriving from the signal Si to be extracted. As described above, the signal Si can be any type of signal carrying a protocol allowing an identifier to be extracted from a radio endpoint. The radio endpoint comprises any equipment capable of regularly broadcasting a radio signal in its vicinity in order to connect other radio equipments to various local or remote services.

At P2, a location module ML is requested by sending a request R(Tx) associated with the time of reception of at least one signal Si. In response to this request R(Tx), the location module ML provides location estimate information Li(Tx) for at least one radio endpoint BRi at the time Tx, such that Li(Tx) comprises location coordinates {Xi, Yi, Zi} and the time Tx. The location coordinates can be of any type, such as, for example, coordinates of a three-dimensional Euclidean space or spherical coordinates, or according to any other mathematical or standard model allowing an object to be located.

Subsequently, at P3, according to the method, the location estimate {Xi, Yi, Zi} is made to correspond to the identifier ID(BRi) and the time Tx, for at least one radio endpoint BRi in an association of information Ai(Tx) associated with the endpoint BRi.

At P4, according to the method, this association Ai(Tx), which is linked to the at least one radio endpoint BRi by means of a broadcast signal S(Ty) at the time Ty, is broadcast to any object OCj capable of receiving this radio broadcast. The time Ty is obviously later than the time Tx. In addition, according to the method, this association of information can be broadcast at multiple times later than Tx. It is even possible to set a delay D, so that the broadcast of an association of information is possible at multiple times Ty between Tx and Tx+D. Subsequently, a new broadcast of at least one association of information made according to the method can be triggered, following a new signal acquisition at a time Tx' later than Tx.

Figure 3:
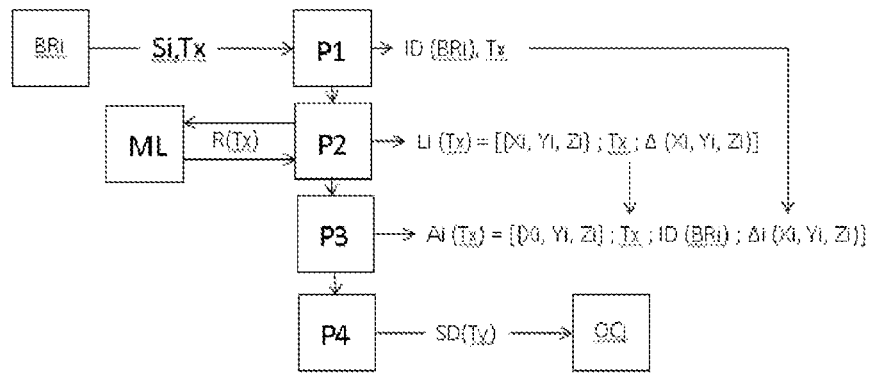
FIG. 3 shows another implementation example for the main steps of a method according to the invention in detail.

FIG. 3 illustrates another implementation example for the main steps of the method according to the invention that are implemented by a mobile radio terminal. At P1, at least one radio signal Si deriving from at least one radio endpoint BRi located within radio range of the mobile terminal is received at the time Tx. The processing carried out by the mobile radio terminal at P1 allows at least one identifier ID(BRi) deriving from the signal Si to be extracted.

At P2, a location module ML receives a request R(Tx) associated with the time of reception of at least one signal Si. In response to this request R(Tx), the location module ML provides location estimate information Li(Tx) for at least one radio endpoint at the time Tx, the information Li(Tx) comprising location coordinates {Xi, Yi, Zi}, a margin of error Δi(Xi, Yi, Zi) for the estimate of the location, and the time Tx. The margin of error is calculated by the location module and allows the accuracy of the estimate of the location to be indicated. This margin of error can take any possible form, but it is, however, dependent on the data format and the system used to estimate the location of the endpoint BRi in question.

Subsequently, at P3, the location estimate {Xi, Yi, Zi}, the margin of error Δi(Xi, Yi, Zi), is made to correspond to the identifier ID(BRi) and the time Tx, for at least one radio endpoint BRi, in an association of information Ai(Tx) concerning the endpoint BRi.

At P4, the association Ai(Tx), which is linked to at least one radio endpoint BRi, is broadcast by means of a broadcast signal SD(Ty), at the time Ty, to any object OCj capable of receiving this radio broadcast. The broadcast time Ty is obviously later than the time Tx. In addition, according to the method, it is possible to broadcast this association of information at multiple times later than the time Tx. According to the method, it is even possible to set a delay D so that the broadcast of at least one association of information is possible at multiple times Ty between Tx and Tx+D. Subsequently, a new broadcast of at least one association of information made according to the method can be triggered following a new signal acquisition at a time Tx' later than the time Tx.

Figure 4:
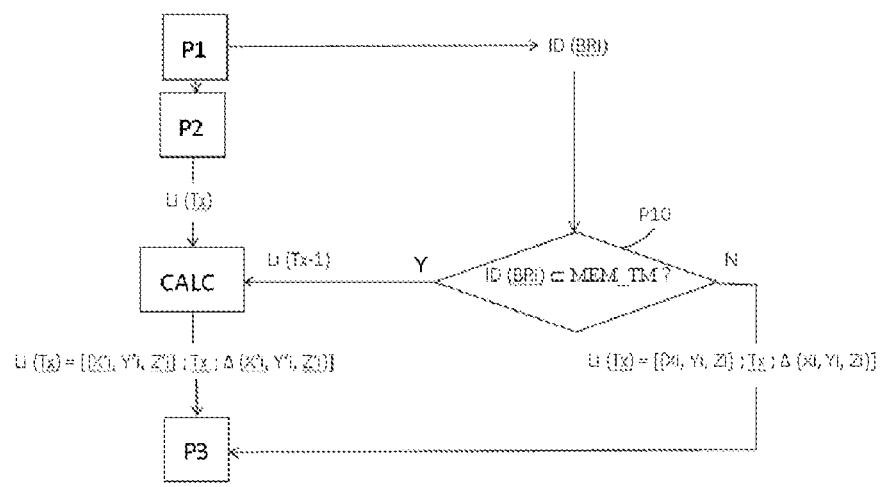
FIG. 4 shows another implementation example for certain steps of a method according to the invention in detail.

FIG. 4 illustrates another implementation example for the method of the invention that is implemented by a mobile radio terminal. In this example, according to the method, steps P1 and P2 are implemented, which are strictly identical to those already described in relation to FIGS. 2 and 3.

The method illustrated in FIG. 4 differs from the examples described in connection with FIGS. 2 and 3 by the fact that each identifier ID(BRi) of a radio endpoint BRi that is extracted at P1 is compared, at P10, with other identifiers saved in a memory MEM_TM of the mobile terminal TM. If it is determined that the identifier ID(BRi) is already present in the memory MEM_TM ("Y" case in FIG. 4), a calculation operation CALC is triggered, during which a new location estimate for at least one radio endpoint is calculated. This new location estimate takes account of the last location estimate Li(Tx) obtained at P2 at the time Tx and of at least one location estimate Li(Tx−1) saved in the memory MEM_TM of the mobile radio terminal, at at least one prior time Tx−1. When, according to a particular implementation of the method according to the invention, multiple location estimates Li are stored, at multiple (P) times (P being an integer) Tx−1, Tx−2, ..., Tx-P earlier than the time Tx, the calculation step CALC then takes account of the P previous location estimates, in relation to the current estimate Li(Tx), to calculate a new estimate Li(Tx) comprising new coordinates X'i,Y'i,Z'i. To calculate this new estimate, it is possible to use methods known from the prior art, such as for example the method of multilateration, bilateration, barycenter, etc. The aforementioned new geographical coordinates concerning at least one radio endpoint are then associated, at P3, with the identifier ID(BRi) of the radio endpoint and with the current time Tx.

If, at the end of the comparison step P10, it is determined that at least one identifier ID(BRi) is not present in the memory MEM_TM ("N" case in FIG. 4), then, following step P2 of obtaining an estimate of the location Li(Tx) at the current time Tx, no additional calculation step CALC is performed, and the location information Li(Tx) is associated, at P3, with the identifier ID(BRi) and the current time Tx, as already described with reference to FIGS. 2 and 3.

The calculation step CALC allows, in the event of the identifier ID(BRi) of the radio endpoint indeed being present in the memory MEM_TM, a new margin of error Δ (X'i, Y'i, Z'i) for the location estimate calculation to be calculated by taking account of the margin of error Δ (Xi, Yi, Zi) obtained in step P2 at the reference time Tx and the margin of error Δ (Xi, Yi, Zi) deriving from the location estimate Li(Tx−1), obtained previously and stored in the memory MEM_TM of the mobile terminal, at an earlier time Tx−1. The calculation step CALC also allows, in the aforementioned case, a new margin of error Δ (X'i, Y'i, Z'i) for the calculation of the estimate to be calculated by taking account of the margin of error Δ (Xi, Yi, Zi) obtained in step P2 at the reference time Tx and multiple margins of error Δ (Xi, Yi, Zi) deriving from multiple location estimates Li(Tx−1), Li(Tx−2) . . . Li(Tx-P), obtained previously and saved in the memory MEM_TM of the mobile terminal, at multiple respective earlier times Tx−1, Tx−2 . . . Tx-P.

Figure 5:
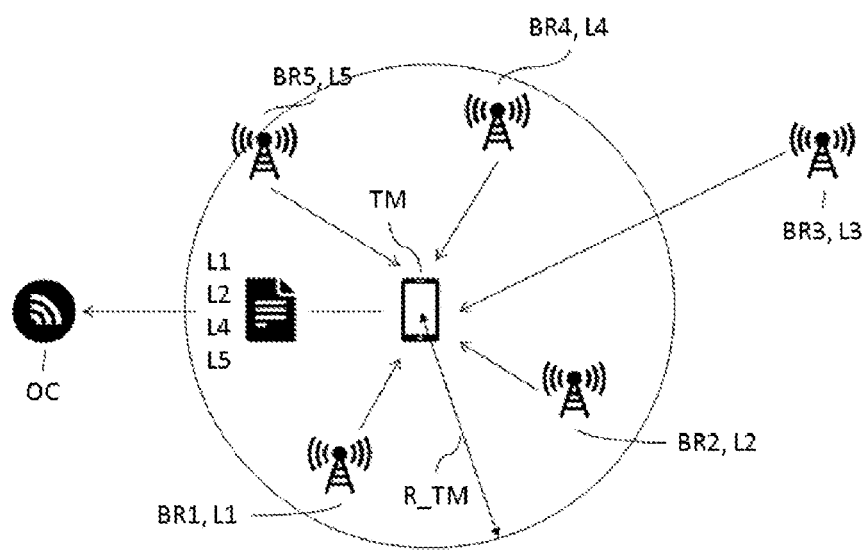
FIG. 5 shows an illustrative diagram of a particular environment in which a method according to the invention is implemented.

FIG. 5 illustrates a particular exemplary implementation of the invention. As explained above in connection with FIG. 1, in the present example, the mobile radio terminal TM, in step P1, receives five signals S1 to S5. At the end of step P1, it extracts five identifiers, ID(BR1) to ID(BR5), from these signals. In step P2, it obtains an estimate of the location for each of these radio endpoints, i.e. five estimates L1 to L5 at the current time Tx. In step P3, these location estimates are associated with the identifiers of the five radio endpoints and with the current time Tx. In step P4, according to the method, only these five estimates can be broadcast around the terminal TM, and therefore to the connected object OC, for example. According to the method, a decision can also be made in the mobile terminal TM to broadcast all the associations of information that are saved in the memory MEM_TM of the terminal.

However, there is the possibility of a broadcast of a file that is too large not being compatible with the computing capabilities and the resource constraints of the connected object receiving the aforementioned associations of information. In this case, it is possible, according to the method, to broadcast only the associations of information concerning the radio endpoints whose estimated location is in an area within a given radius R_TM around an estimate of the position of the mobile terminal TM. The position estimate for the terminal can be provided by a location module ML (cf. FIGS. 2 and 3) integrated in the mobile terminal TM or else accessible remotely by the terminal TM. Before the associations of information are broadcast to the connected object, a sorting operation is then performed at P4, according to the method, for the radio endpoints whose location estimates are in the aforementioned area, and only the associations of information concerning the radio endpoints located in this area are selected. In the example shown, only the endpoints BR1, BR2, BR4, BR5 are located in the area defined by a circle of radius R_TM. In this case, the mobile terminal TM therefore broadcasts a data file comprising only the associations of information corresponding to the radio endpoints located in the aforementioned area.

In a particular embodiment of the method, not shown in the drawings, it is possible to decide to transmit only the most recent association of information by radio endpoint BRi, in order to limit the size of the data transmitted in the broadcast signal (P4). However, the entire history of the associations of information saved in the memory MEM_TM of the mobile terminal will be able to be broadcast, so that the connected object that receives this information has a significant amount of data to refine its location.

Figure 6:
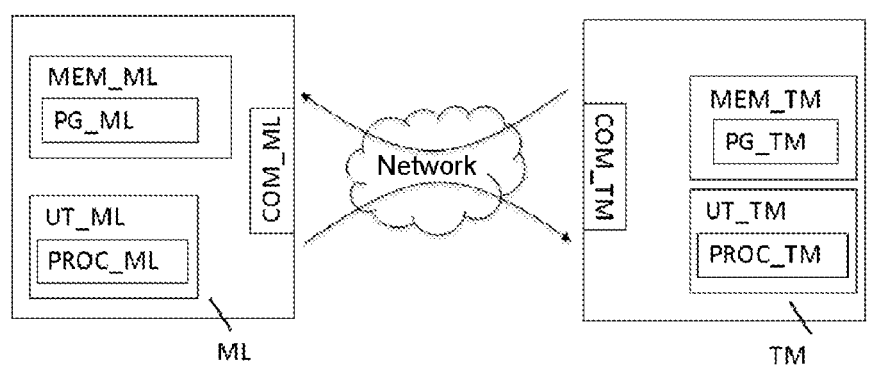
FIG. 6 shows a diagram of a device implementing a communication method according to the invention.

According to a particular embodiment of the invention shown in FIG. 6, the communication method is implemented by the mobile radio terminal TM.

In this embodiment, the location module ML is a computer or a server, for example. For this, the location module ML has the conventional architecture of a computer and comprises in particular a memory MEM_ML, a processing unit UT_ML, for example equipped with a processor PROC_ML, and controlled by the computer program PG_ML stored in memory MEM_ML. The computer program PG_ML comprises instructions for implementing actions for estimating the location of at least one radio endpoint, when the program is executed by the processor PROC_ML. On initialization, the code instructions of the computer program PG_ML are for example loaded into a RAM memory (not shown) before being executed by the processor PROC_ML. The processor PROC_ML of the processing unit UT_ML implements an action for estimating the location of at least one radio endpoint, according to the instructions of the computer program PG_ML. As already described above, such an estimate of the location is then transmitted to the mobile radio terminal TM, which receives it at P2 (cf. FIGS. 2 to 4).

The mobile radio terminal TM is a smartphone, for example. For this, the mobile radio terminal has the conventional architecture of a computer and comprises in particular a memory MEM_TM, a processing unit UT_TM, for example equipped with a processor PROC_TM, and controlled by the computer program PG_TM stored in memory MEM_TM. The computer program PG_TM comprises instructions for implementing the actions for evaluating the location of at least one fixed radio transmitter by means of a radio receiver as described above, when the program is executed by the processor PROC_TM. On initialization, the code instructions of the computer program PG_TM are for example loaded into a RAM memory (not shown) before being executed by the processor PROC_TM. The processor PROC_TM of the processing unit UT_TM in particular implements the method for communicating an estimate of the location of at least one radio endpoint to a connected object described above, according to the instructions of the computer program PG_TM.

In the embodiment shown in FIG. 6, the location module ML and the mobile radio terminal TM can be interconnected and interchange data over one or more communication link(s), using one or more networks of different types (called network in FIG. 6) and various protocols by means of communication modules called COM_ML and COM_TM. Examples of networks are a fixed network, a cellular network (for example according to the standards 2G (GSM, GPRS, EDGE), 3G (UMTS), 4G (LTE), LTE-A, LTE-M, WCDMA, CDMA2000, HSPA, 5G, or their variants or evolutions), another type of radio network (e.g. Wi-Fi® or Bluetooth®), an IP network, a combination of several of these networks, etc.

Figure 7:
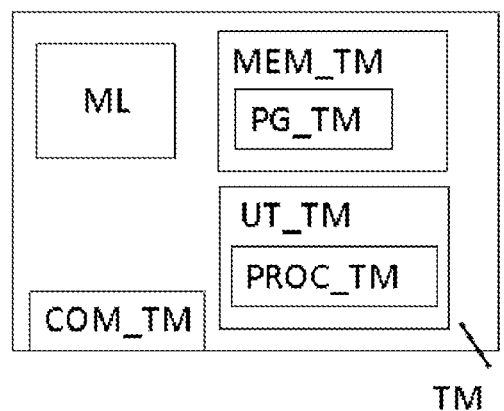
FIG. 7 shows a diagram of another device implementing a communication method according to the invention.

According to another particular embodiment of the invention, shown in FIG. 7, the communication method is implemented by a mobile radio terminal TM as described above, but comprising a location module ML as described above.

It goes without saying that the embodiments described above have been given purely by way of completely non-limiting indication, and that numerous modifications may be easily made by a person skilled in the art without, however, departing from the scope of the invention.

The invention claimed is:

1. A method for communicating an estimate of a location of at least one radio endpoint to at least one connected object, wherein the method is implemented by a mobile terminal and comprises:
   receiving, at a given time, from at least one received radio signal, at least one identifier of said at least one radio endpoint,
   obtaining at least an estimate of the location of said at least one radio endpoint,
   associating the estimate of said location of said at least one radio endpoint and said given time with said at least one identifier, and
   broadcasting said association to said at least one connected object, which is situated in a vicinity of the mobile terminal, by using at least one broadcast radio signal, the estimate of said location of said at least one radio endpoint also being representative of the location of the at least one connected object, and usable by the at least one connected object to locate itself.

2. The method as claimed in claim 1, wherein said estimate of the location of at least one radio endpoint is provided by the mobile terminal or by a third-party terminal or service, and is communicated to the mobile terminal.

3. The method as claimed in claim 1, comprising updating said estimate of the location of said at least one radio endpoint following acquisition, at a later time, of at least one new piece of location information for at least one radio endpoint.

4. The method as claimed in claim 1, wherein said at least one broadcast radio signal is a short-range radio signal.

5. The method as claimed in claim 1, wherein said at least one received radio signal is a signal deriving from a local access point.

6. The method as claimed in claim 1, wherein said estimate of the location comprises margin-of-error information for said estimate.

7. The method as claimed in claim 1, wherein said association that is broadcast is the one that comprises said at least one identifier associated with the at least one radio endpoint located within a given radius around the mobile terminal.

8. The method as claimed in claim 1, wherein said association that is broadcast is the one that comprises the most recent time of reception of at least one said identifier.

9. The method as claimed in claim 1, wherein said broadcast comprises location information for the mobile terminal.

10. A non-transitory computer-readable recording medium or information medium, comprising instructions of a computer program stored thereon which when executed by a processor of a mobile radio terminal configure the mobile radio terminal to implement a method for communicating an estimate of a location of at least one radio endpoint to at least one connected object, wherein the method comprises:

receiving, at a given time, from at least one received radio signal, at least one identifier of said at least one radio endpoint, obtaining at least an estimate of the location of said at least one radio endpoint, associating the estimate of said location of said at least one radio endpoint and said given time with said at least one identifier, and broadcasting said association to said at least one connected object, which is situated in a vicinity of the mobile terminal, by using at least one broadcast radio signal, the estimate of said location of said at least one radio endpoint also being representative of the location of the at least one connected object, and usable by the at least one connected object to locate itself.

11. A mobile radio terminal comprising:

a processor; and a non-transitory computer-readable medium storing instructions of a computer program which when executed by a processor of the mobile radio terminal configure the mobile radio terminal to implement a method for communicating an estimate of the location of at least one radio endpoint to at least one connected object, comprising the following operations:

receiving, at a given time, by means of at least one received radio signal, at least one identifier of said at least one radio endpoint;

obtaining at least an estimate of the location of said at least one radio endpoint;

associating the estimate of said location of said at least one radio endpoint and said given time of reception with said at least one identifier; and broadcasting said association to said at least one connected object, which is situated in a vicinity of the mobile terminal, by using at least one radio signal, the estimate of said location of said at least one radio endpoint also being representative of the location of the at least one connected object, and usable by the at least one connected object to locate itself.

\* \* \* \* \*